United States Patent [19]

Boswell

[11] Patent Number: 5,359,923
[45] Date of Patent: Nov. 1, 1994

[54] SMOKER AND COOKER WITH IMPROVED ADJUSTABLE SPACED GRILL SUPPORT

[76] Inventor: Burl Boswell, 6507 Barksdale Blvd., #80, Bossier City, La. 71112

[21] Appl. No.: 120,367

[22] Filed: Sep. 14, 1993

[51] Int. Cl.⁵ .................. A47J 37/00; A47J 37/04; A47J 37/07
[52] U.S. Cl. .......................... 99/340; 99/444; 99/448; 99/450; 99/482; 126/9 R; 126/25 R
[58] Field of Search .......... 99/339, 340, 444-446, 99/448, 450, 449, 447, 481, 482; 126/25 R, 25 A, 9 R, 9 B, 41 R

[56] References Cited

U.S. PATENT DOCUMENTS

| | | | |
|---|---|---|---|
| 1,837,924 | 12/1931 | Rutherford | 99/482 X |
| 3,455,291 | 7/1969 | Glass | 126/137 |
| 3,559,565 | 2/1971 | Getz | 99/340 |
| 3,841,211 | 10/1974 | Ellis | 126/25 R |
| 4,020,322 | 4/1977 | Muse | 99/448 |
| 4,094,295 | 6/1978 | Boswell et al. | 126/25 |
| 4,353,347 | 10/1982 | Seed | 126/41 R |
| 4,467,709 | 8/1984 | Anstedt | 99/482 |
| 4,495,860 | 1/1985 | Hitch et al. | 126/9 R |
| 4,512,249 | 4/1985 | Mentzel | 126/9 B |
| 4,554,864 | 11/1985 | Smith et al. | 99/482 X |
| 4,957,039 | 9/1990 | Reyes | 126/25 R |
| 4,962,696 | 10/1990 | Gillis | 99/340 |
| 4,962,697 | 10/1990 | Farrar | 99/340 |
| 5,048,401 | 9/1991 | Hoover | 99/339 |
| 5,069,196 | 12/1991 | Schlosser et al. | 126/25 R |
| 5,105,726 | 4/1992 | Lisker | 99/450 |

Primary Examiner—Timothy F. Simone
Attorney, Agent, or Firm—Jacobson, Price, Holman & Stern

[57] ABSTRACT

A combination smoker and cooker comprising adjustably spaced grills so as to make easier access to the grills and to replenish cooking fuel. The cooker comprises a grill support bar for supporting multiple grills including a water pan steamer assembly, at adjustable vertically spaced intervals in a housing. The grill support bar comprises pairs of vertically spaced slots cut into oppositely facing sides thereof and is held in the housing by a socket which is sized and shaped to firmly receive a bottom end of the support bar and secure the support bar in place in the cooker.

19 Claims, 3 Drawing Sheets

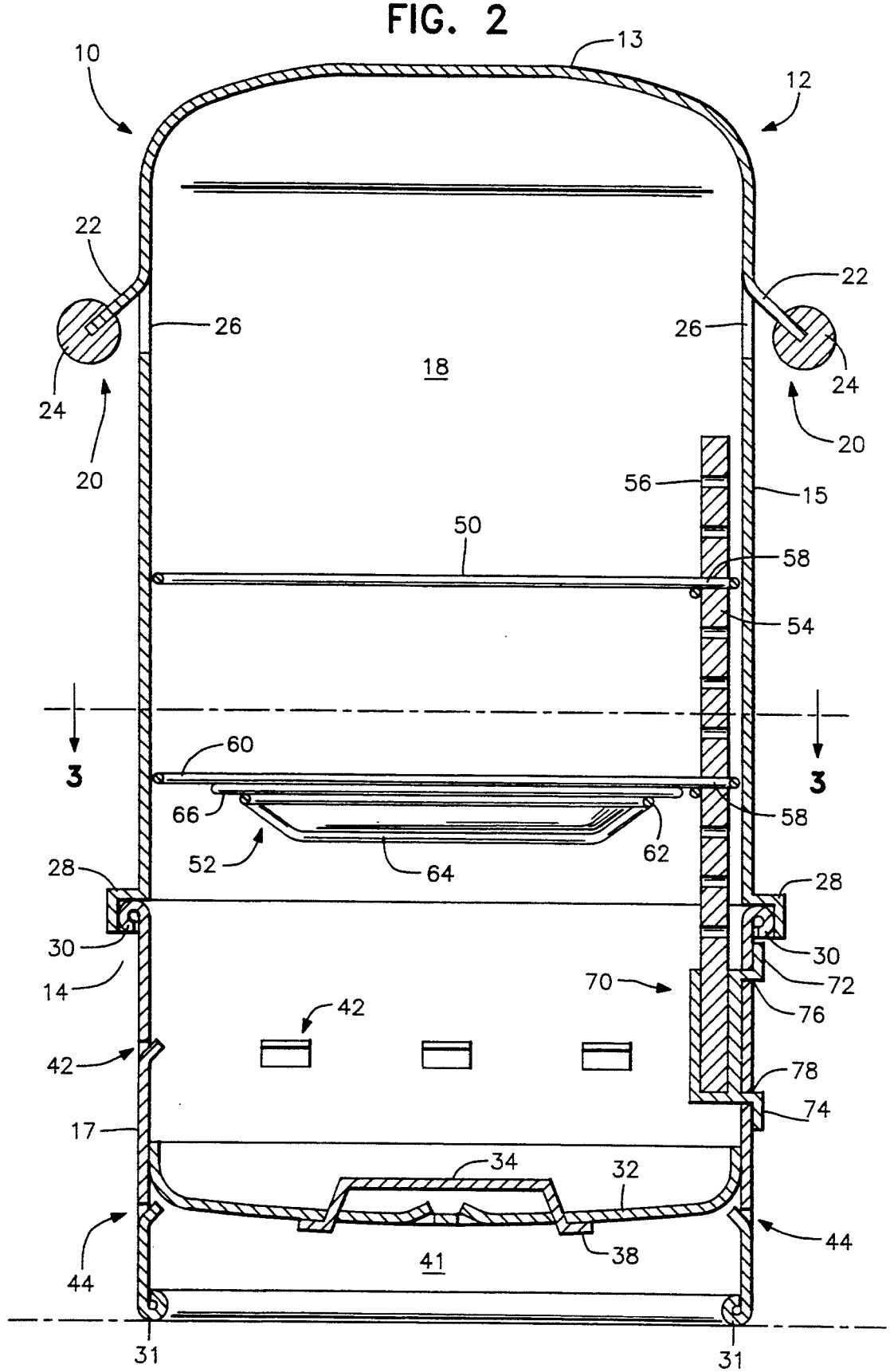

SMOKER AND COOKER WITH IMPROVED ADJUSTABLE SPACED GRILL SUPPORT

BACKGROUND OF THE INVENTION

The present invention relates to a combination smoker and cooker having an improved and adjustable grill support structure.

Large smoker and cooker devices are useful in cooking and steaming food in a single unit. Charcoal briquettes with flavoring wood chips or sticks are burned at the bottom of the cooker to cook food on grills and steam water supported above the burning fuel. For example, see my prior U.S. Pat. No. 4,094,295. In that device, multiple grills are supported within a cylindrical cooking housing.

An important feature of a combination smoker and cooker is the ability to remove food from the grills of the cooker without the need to remove other grills. This feature is afforded in my prior design, which is the subject of the aforementioned patent. However, there is room for improvement, particularly in regard to the need to remove the grills to add or remove food, or to add more fuel to the cooker.

SUMMARY OF THE INVENTION

It is an object of the present invention to provide a combination smoker and cooker comprising adjustably spaced grills so as to make for easier access to the grills and to replenish cooking fuel.

It is another object of the present invention to provide a combination smoker and cooker in which the cooking grills and water pan may be inserted and/or removed from the cooking housing without tilting the cooking cylinder or grill.

It is still another object of the present invention to provide a grill support structure which permits easy insertion and removal of a grill from the cooker, and for adjustably spacing the grills in the cooker.

It is yet another object of the present invention to provide a smoker and cooker which can be broken down into a compact package for shipment, yet easy to assemble for use or sales display.

The combination smoker and cooker of the present invention comprises a support bar for supporting multiple grills including a grill/water pan steamer assembly, at adjustable vertically displaced intervals. The grill support bar comprises pairs of vertically spaced slots cut into oppositely facing sides of the support bar and is held in the housing by a grill support bar socket which is sized and shaped to firmly receive a bottom end of the support bar and secure the support bar in place in the cooker.

The above and other objects and advantages of the present invention will become more readily apparent when reference is made to the following description taken in conjunction with the accompanying drawings.

BRIEF DESCRIPTION OF THE DRAWINGS

FIG. 2 is a cross sectional view of the smoker and cooker, which also illustrates the internal construction of the apparatus.

DETAILED DESCRIPTION OF THE DRAWINGS

Figure 1:
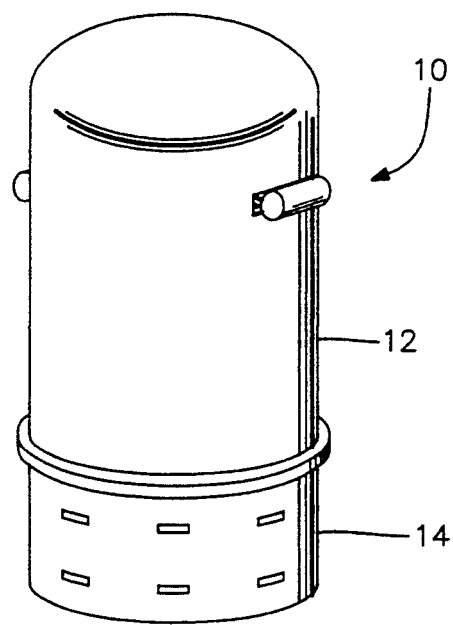
FIG. 1 is a perspective view of the combination smoker and cooker according to the present invention.

Referring first to FIGS. 1 and 2, the combination smoker and cooker is generally shown at 10, and includes a housing comprising a cylindrical lid 12 and a cylindrical base 14. A cooking chamber 18 is defined within the space between the lid 12 and base 14. The lid includes a dome shaped top 13 and a cylindrical wall 15. The base 14 comprises a cylindrical wall 17 which terminates at the top in an outwardly folded bead 30 and at the bottom in an inwardly folded bead 31.

The lid 12 includes handles 20 which are essentially striked-out portions 22 of the lid 12 onto which cylindrical wood dowels 24 are attached. As a result of the striked-out portions 22, vents 26 are created below the handles 20, which lead into a top area of the cooking chamber 18.

The lid 12 fits onto the base 14 by way of a circular flange 28 which terminates at the lower end of the lid. The flange 28 includes a horizontal surface portion and a vertical surface portion. The flange 28 fits tightly over the bead 30, with the horizontal portion resting on the top of the bead 30 and the vertical surface portion firmly fitting against the lateral portion of the bead 30. This seals in the heat in the cooking chamber 18.

Figure 5:
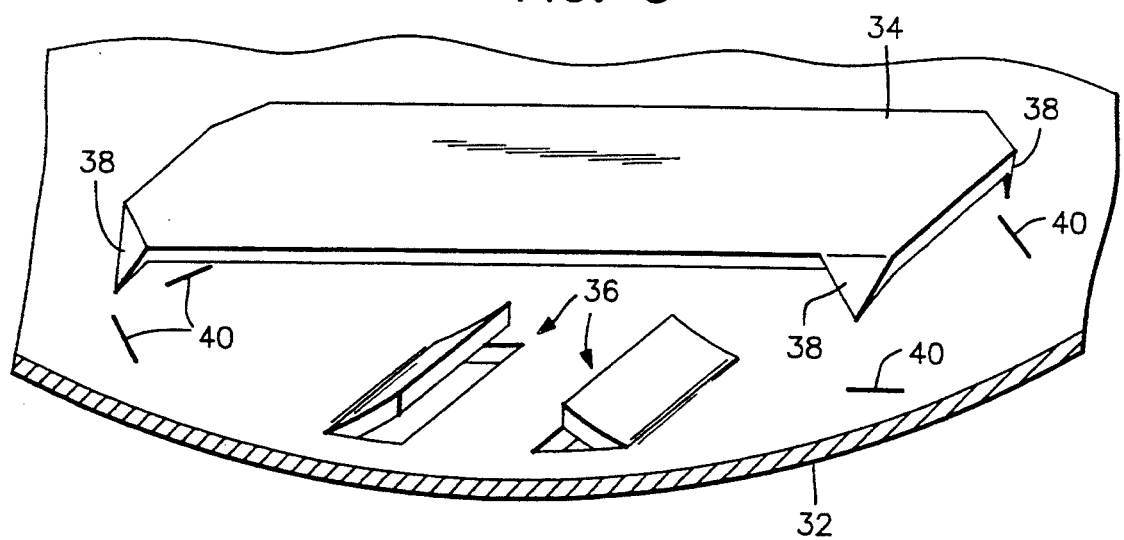
FIG. 5 is an enlarged internal view of the ash plate which attaches to the fuel pan in the apparatus.

The base 14 includes a fuel support pan 32 and an ash plate 34, which are shown in greater detail in FIG. 5. The fuel support pan 32 is disposed concentrically in said base and has upwardly-striked louver air vents 36 cut therein in the center. The ash plate 34 is a square (approximately seven inches by seven inches) rectangular member having four turned-down triangular corner tabs 38 which fit into slits 40 cut in the fuel pan and is designed to prevent ashes from spilling out of the vents 36, while still allowing air in to facilitate burning of the fuel. The tabs 38 fit through the slits 40 and are bent upwards flush with the lower surface of the fuel pan 32 to lock to the fuel pan 32. An air intake chamber 41 is defined in the region between the fuel pan 32 and the ground. The fuel pan 32 has a slightly concave curvature with respect to a center point of the pan for directing air from the intake chamber 41 to the fuel, such as charcoal, supported on the upper surface of the fuel pan.

There are two sets of vents in the base 14. A first array of vents 42 is provided around the base 14 above the fuel pan 32, and a second array of vents 44 is provided around the base 14 below the fuel pan 32. The vents 42 and 44 comprise louvers inwardly-striked by a suitable tool of the wall 17 of the base 14. The vents 44 provide access for air to enter the base 14 and assist in the burning of fuel supported on the fuel pan 32. The vents 42 serve as exhaust for the burning fuel on the fuel pan 32 and otherwise regulate the temperature in the cooker.

Figure 3:
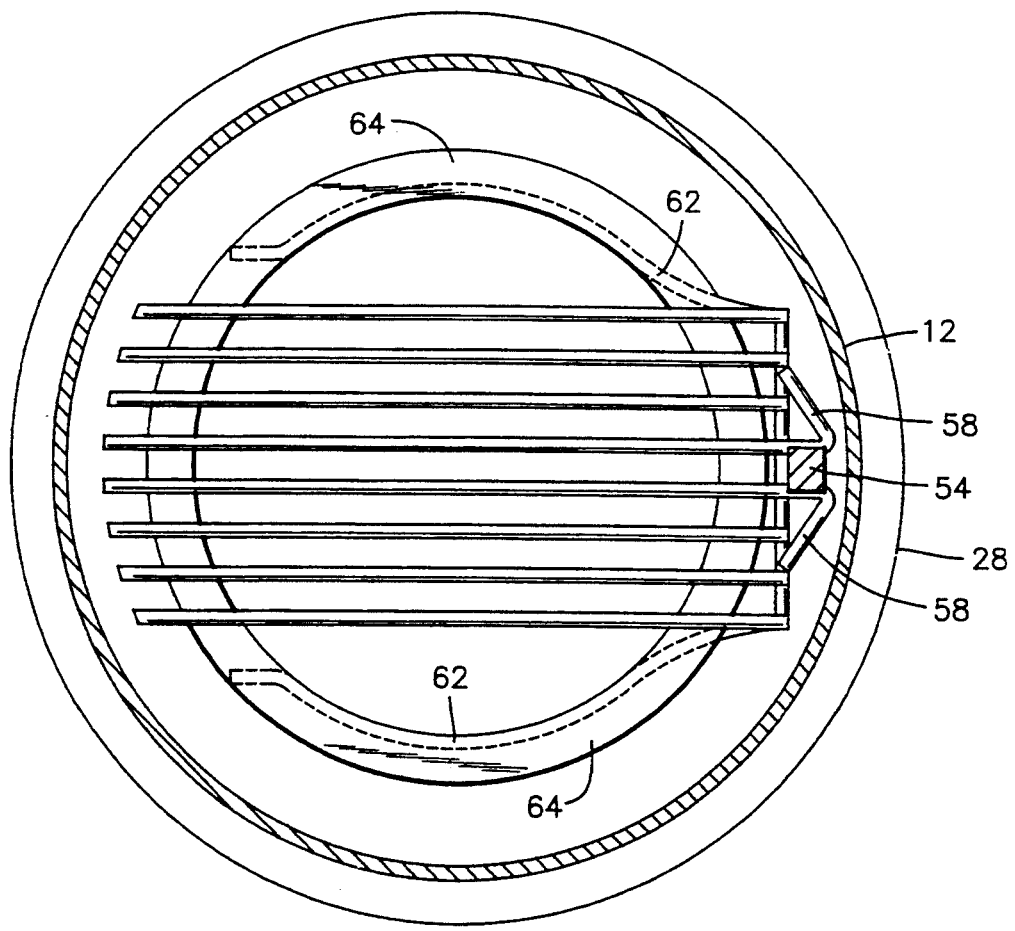
FIG. 3 is a sectional view taken along line 3—3 of FIG. 2.
Figure 4:
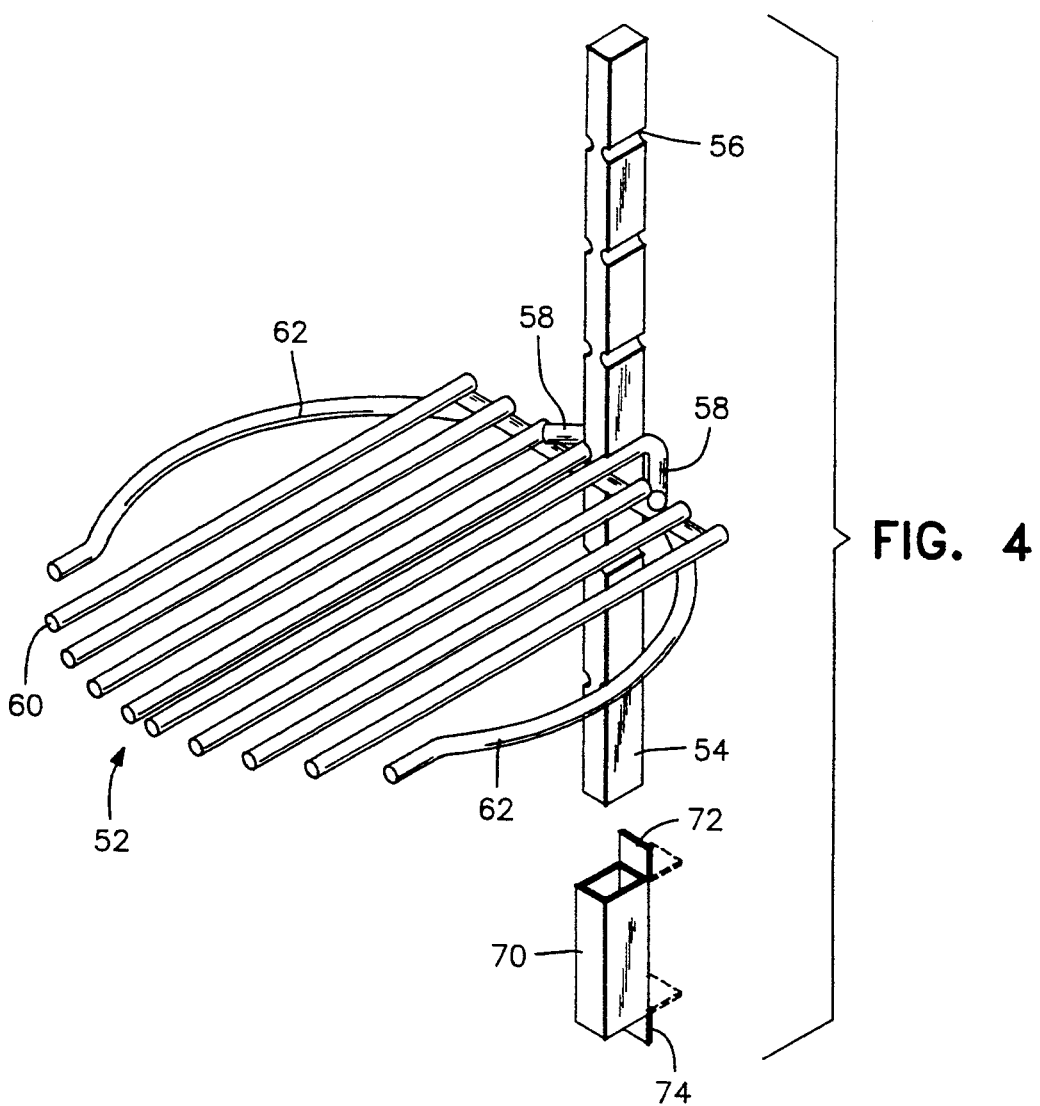
FIG. 4 is a perspective view of the grill support bar and support bar socket, with a removably attachable grill/water pan steamer assembly.

Inside the cooking chamber 18, and above the fuel pan 32, a grill 50 comprising a grating cooking surface, and a grill/water pan steamer assembly 52 are supported on a support bar 54, shown in detail in FIG. 4. Both the grill 50 and grill/water pan assembly 52 have oppositely facing V-shaped wire extensions 58. The wire extensions 58 are biased towards each other so as to form a clamping member. The support bar 54 is an elongated member having pairs of vertically spaced slots 56 on opposite facing surfaces. The slots are designed to receive the wire extensions 58 of the grill 50 or grill/water steamer pan assembly 52, as best shown in FIGS. 3 and 4. The wire extensions 58 clamp onto the support bar 54 in the slot 56. The vertical spacing between the slots is approximately three inches.

The grill/water pan steamer assembly 52 comprises a grating cooking surface 60 and two pan wire support arms 62 which curve outward from the cooking surface 60 and inward at their distal ends. A pan 64 includes a peripheral flange or lip 66 which rests on the pan wire support arms 62, below the cooking surface 60. Therefore, water may be boiled in the pan 64 to steam food supported on the cooking surface 60.

The support bar 54 is vertically supported inside the cooking chamber 18 by a support bar socket 70. The support bar socket 70 is essentially a socket comprised of four side walls and a bottom wall, and an open top, which receives the support bar 54. In addition, two tabs 72 and 74 are provided which are designed to fit through slits 76 and 78, respectively, from the interior of the base 14, as shown in FIG. 2. When shipped, the tabs are in the phantom position as shown in FIG. 4 to enable them to be inserted and bent. The tab 72 is bent upwards and the tab 74 is bent downwards on the outside of the base 14 to firmly attach to the base 14. The socket 70 is sized to firmly receive and secure the support bar 54 inside the cooking chamber 18. It is to be understood that the thickness of the tabs is such to allow for easy bending, yet strong support, and that the thickness shown in FIG. 2 are not necessarily to scale, as would be understood by one with ordinary skill in the art.

The grill 50 and grill/water pan steamer assembly 52 may easily be removed from the cooker by pulling the V-shaped wire extensions from the slots 56 and reinserting them into slots at different levels on the support bar 56. In the same manner, the vertical spacing between them is easily adjustable. It is not necessary to tilt the cooker to remove or adjust the vertical spacing of the grills. In addition, more than two grills may be disposed in the cooker, because the support bar 54 can accommodate several layers of cooking surfaces.

More importantly, access inside the cooking chamber to either of the cooking surfaces on the grill or grill/water pan assembly 52 is achieved without the need to remove either from the cooker. The lid 12 may be lifted off the base 14. This makes it possible to access food items on any cooking surface. Further, it is not necessary to remove the water pan 64 to replenish the fuel on the fuel pan 32. This eliminates the risk of spilling water. However, for major refueling, the grills may be removed, but it is still not necessary to reach down into the hot base cylinder to add fuel. Further, the grills may be spaced at intervals as small as three inches, which eliminates the need for rib racks, corn sticks, and other types of spacer accessories.

The materials used to construct the cooker may vary. Sheet metal of appropriate thickness has been proven to be adequate for the lid 12 and base 14. Also, the fuel pan 32, ash plate 34, and support bar socket 70 are preferably formed of sheet metal of appropriate thickness.

The dimensions of the cooker may vary. The overall height of the cooker is approximately 44 inches and has a diameter of approximately 17 inches. This enables a maximum of approximately 15 pounds of charcoal briquettes to be placed in the fuel pan.

In use, charcoal or other types of fuel is disposed on the fuel pan 32. Lighter fluid is usually helpful to ignite the charcoal. The lid 12 is removed to coat the charcoal but the grill 50 and grill/water pan assembly 52 need not be removed. Once the charcoal is burning well, food can be put on the grill 50, and depending on the amount of food to be cooked, several grills can be used to support several layers of food. The water pan is capable of holding up to 8 quarts of water to steam food placed on the cooking surface 60. If desired, sticks or chips of wood such as hickory, pecan and the like, may be placed in with the charcoal to provide a desired flavor characteristic to the meat.

Many types of meat items may be cooked, such as pork roasts, ribs, hams, poultry, seafood, pork chops, sausage, lamb roasts, steaks, ground beef patties and the like. The water pan can collect meat drippings to be used as a base for gravy or barbecue sauce. Once the cooking operation begins, the lid 12 is not removed from the base 14 and the cooker remains assembled, except to check food on the grill or to add charcoal.

The smoker and cooker is shipped substantially disassembled. The support bar 54 and socket 70 are disassembled from the housing. The grills 50 and grill/water pan steamer assembly 52 are detached from the support. The water pan 64 is detached from the assembly 52. For use or display, the socket 70 is inserted on the wall of the base and the support bar 54 is inserted into the socket 70. The grills may then be attached to the support bar 54.

Moreover, when not in use or for transport, the grill support bar 54 can be removed from the socket 70. Also, the grills can be removed from the grill support bar.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A smoker and cooker comprising:
   a vertically oriented housing comprising a base and a lid, wherein said lid vertically and removably fits onto the base;
   a fuel support pan being disposed in said base and having air vents therein;
   grill support means having a plurality of vertically spaced intervals for adjustably supporting multiple grills within the housing;
   securing means for removably securing the grill support means in place in said cooker; and
   at least one grill means comprising a cooking surface and including means for removably attaching to the grill support means at each of said plurality of vertically spaced intervals.

2. The smoker and cooker of claim 1, and further comprising:
   a first plurality of vents being provided at spaced intervals on a side wall of the base below said fuel support pan; and
   a second plurality of vents being provided at spaced intervals on the side wall of the base above the fuel support pan.

3. The smoker and cooker of claim 1, and further comprising:
   a pair of vertically spaced slits cut into a side wall of the base above the fuel support pan; and
   said securing means comprising a support bar socket having first and second vertically spaced tabs which are bendable from a first position to fit into the respective ones of the pair of slits on the side wall and bend substantially perpendicular to the first position to lock onto the side wall.

4. The smoker and cooker of claim 1, wherein the base terminates at a top in an outwardly folded bead for supporting the lid and at the bottom in an inwardly folded bead which rests on the ground.

5. The smoker and cooker of claim 2, wherein the first and second plurality of vents on the side wall of the base comprise inwardly-striked louvers in the side wall.

6. The smoker and cooker of claim 1, wherein the grill support means comprises an elongated bar having pairs of vertically spaced oppositely facing slots cut therein.

7. The smoker and cooker of claim 6, wherein the grill means comprises a grating cooking surface and said means for removably attaching comprises oppositely facing V-shaped wire extensions which removably fit into pairs of oppositely facing slots of said elongated bar.

8. The smoker and cooker of claim 7, and further comprising a grill/water pan steamer assembly comprising a grating cooking surface, a pair of pan wire support arms beneath the grating cooking surface and a pan having a top peripheral flange which rests on the pan wire support arms, said grill/water pan steamer assembly including oppositely facing V-shaped wire extensions which removably fit into a pair of oppositely facing slots in said elongated bar.

9. The smoker and cooker of claim 1, and further comprising an ash plate attached to the fuel support pan and disposed above the air vents with space therebetween.

10. The smoker and cooker of claim 1, wherein a pair of outwardly-striked louvers are formed on the lid at ends of which are attached cylindrical wooden handles.

11. The smoker and cooker of claim 1, wherein a top peripheral edge of the base terminates in a folded bead and a bottom peripheral edge of the lid terminates in a flange adapted to securely fit onto the folded bead of the base.

12. The smoker and cooker of claim 9, wherein the fuel support pan has a slightly concave curvature with respect to a center point of the fuel support pan for directing air to the fuel in cooperation with the ash plate.

13. A smoker and cooker comprising:
   a vertically oriented housing comprising a base and a lid, wherein said lid vertically and removably fits onto the base, the base comprising a side wall;
   a fuel support pan being disposed concentrically in said base and having air vents therein and a plurality of slots cut in the fuel support pan;
   a first plurality of vents being provided at spaced intervals on the side wall of the base below said fuel support pan;
   a pair of vertically spaced slits cut into the side wall of the base above the fuel support pan;
   a second plurality of vents being provided at spaced intervals on the side wall of the base above the fuel support pan;
   an ash plate having four bent corner tabs each which fits into one of the plurality of slots of the fuel support pan and disposed above the air vents in the fuel support pan with space therebetween for directing air to fuel supported by the fuel support pan;
   a grill support bar comprising a bottom end and pairs of vertically spaced slots cut into oppositely facing sides thereof for supporting multiple grills at adjustable vertically displaced intervals in the housing;
   a grill support bar socket having first and second vertically spaced bendable tabs which fit through to respective ones of the pair of vertically spaced slits on the side wall and bend to secure the receptacle to the side wall, said support bar socket being sized and shaped to firmly receive the bottom end of the support bar and secure the support bar in place in said cooker;
   at least one grill means comprising a grating cooking surface and including oppositely facing V-shaped wire extensions which removably fit into a pair of oppositely facing slots of said grill support bar; and
   a grill/water pan steamer assembly comprising a grating cooking surface, a pair of pan wire support arms beneath the grating cooking surface and a pan having a top peripheral flange which rests on the pan wire support arms, said water pan steamer assembly including oppositely facing V-shaped wire extensions which removably fit into a pair of oppositely facing slots of said grill support bar.

14. The smoker and cooker of claim 13, wherein the base terminates at a top in an outwardly folded bead for supporting the lid and at the bottom in an inwardly folded bead which rests on the ground.

15. The smoker and cooker of claim 13, wherein the first and second plurality of vents on the side wall of the base comprise inward-striked louvers in the side wall.

16. The smoker and cooker of claim 13, wherein the vents in the fuel support pan comprise upward-striked louvers in the fuel support pan.

17. The smoker and cooker of claim 13, wherein a pair of outward-striked louvers are formed on the lid at ends of which are attached cylindrical wooden handles.

18. The smoker and cooker of claim 13, wherein a top peripheral edge of the base terminates in a folded bead and a bottom peripheral edge of the lid terminates in a flange adapted to securely fit onto the folded bead of the base.

19. The smoker and cooker of claim 13, wherein the fuel support pan has a slightly concave curvature with respect to a center point of the pan for directing air to the fuel in cooperation with the ash plate.

* * * * *